(12) United States Patent
Zilm

(10) Patent No.: US 6,186,530 B1
(45) Date of Patent: Feb. 13, 2001

(54) TRAILER HITCH AND EXTENSION COUPLING FOR USE THEREWITH

(75) Inventor: William M. Zilm, Glenwood Springs, CO (US)

(73) Assignee: Zilm Research and Development, LLP, Glenwood Springs, CO (US)

(*) Notice: Under 35 U.S.C. 154(b), the term of this patent shall be extended for 0 days.

(21) Appl. No.: 09/545,856

(22) Filed: Apr. 6, 2000

(51) Int. Cl.$^7$ .................................................. B60D 1/46
(52) U.S. Cl. .................. 280/496; 280/432; 280/490.1; 280/423.1; 280/441.2
(58) Field of Search .................. 280/433, 423.1, 280/476.1, 432, 406.2, 490.1, 438.1, 440, 439, 441.2, 407.1, 482, 496

(56) References Cited

U.S. PATENT DOCUMENTS

| | | |
|---|---|---|
| 2,038,975 | 4/1936 | Willetts . |
| 2,351,151 | 6/1944 | Sattler . |
| 2,761,699 | 9/1956 | Martin . |
| 3,059,795 | 10/1962 | Schroeder . |
| 3,820,821 | 6/1974 | Leland . |
| 3,823,961 | 7/1974 | Korodi . |
| 3,861,716 | 1/1975 | Baxter et al. . |
| 3,972,542 | 8/1976 | Dirks et al. . |
| 4,068,860 | 1/1978 | Meyers et al. . |
| 4,256,323 * | 3/1981 | McBride ........................ 280/423 R |
| 4,832,358 * | 5/1989 | Bull .................................. 280/418.1 |
| 4,923,243 * | 5/1990 | Drahos .............................. 296/157 |
| 4,955,631 | 9/1990 | Meyer . |
| 5,071,152 | 12/1991 | Ducote . |
| 5,135,248 | 8/1992 | Keiserman . |
| 5,890,728 | 4/1999 | Zilm . |

FOREIGN PATENT DOCUMENTS

| | | |
|---|---|---|
| 2529262 | 1/1977 | (DE) . |
| 322328 * | 6/1989 | (EP) . |
| 827185 | 2/1960 | (GB) . |
| 880848 | 11/1981 | (SU) . |

* cited by examiner

Primary Examiner—Paul N. Dickson
Assistant Examiner—Avraham H. Lerner
(74) Attorney, Agent, or Firm—Timothy J. Martin; Michael R. Henson; Mark H. Weygandt

(57) ABSTRACT

An extension coupling releasably interconnects a trailer to a tow hitch on a tractor vehicle. The apparatus includes a trailer mounting assembly adapted to releasably interconnect to the trailer. The trailer mounting assembly includes a hitch box mount adapted to be secured to a hitch box of the trailer. The trailer mounting assembly also includes an extension coupling which has a proximal end portion secured pivotally to the hitch box mount about a pivot axis. The extension coupling terminates in a distal end portion, and the distal end portion is provided with a pair of oppositely projecting trunnions that extend along a load axis that is perpendicular to the pivot axis. The apparatus also includes a tow hitch assembly adapted to be secured to the bed of a tractor vehicle. The tow hitch assembly includes a pair of spaced apart receivers sized and oriented to engage the trunnions of the extension coupling to define an engaged state.

27 Claims, 6 Drawing Sheets

TRAILER HITCH AND EXTENSION COUPLING FOR USE THEREWITH

FIELD OF THE INVENTION

The present invention broadly concerns the interconnection of a trailer to a tractor vehicle for towing. More particularly, however, the present invention concerns trailer hitch assemblies for travel trailers. The invention specifically is directed to a fifth wheel hitch mountable to a tractor vehicle and an extension assembly that couples thereto.

BACKGROUND OF THE INVENTION

For many years, recreational traveling has enjoyed popularity among a wide spectrum of the population. A concern for any traveler, naturally, is the need to provide for basic needs such as food and shelter. A significant portion of the hotel/motel industry caters to the traveler's need for shelter while the restaurant provides the availability of food and drink.

Despite the availability of overnight accommodations at hotels, motels, and the like, many travelers seek alternative accommodations either as a life-style preference or as a money saving measure. Also, convenient hotel/motel lodgings are not always available at target recreation sites so that alternative accommodations must be made. Here, many travelers prefer to use their own accommodations that they transport with them.

While the simplest form of portable accommodations may be the tent, many travelers find tents to be inconvenient or uncomfortable. Accordingly, many travelers opt for other portable accommodations such as tent, trailers, recreational vehicles, and the travel trailers known as fifth-wheel travel trailers.

As is known, a fifth-wheel travel trailer is, essentially, a small self contained home which may be towed to a desired location by any suitable tractor vehicle, for example, a pick-up truck. The forward portion of the travel trailer is provided with a downwardly depending hitch box and downwardly projecting kingpin. This kingpin is sized and adapted to mate with a standard fifth-wheel hitch that is mounted on the tractor vehicle. Thus, the tractor vehicle supports the travel trailer so that its forward end is elevated above the surface of travel, such as a roadway, while the rear portion of the vehicle is supported on a wheel set so that it may travel over the surface.

The substantial weight of the fifth-wheel travel trailer requires proper loading and mounting of the hitch assembly. Where the typical pick-up truck is employed as the tractor vehicle, the fifth-wheel tow bed hitch is secured in the bed of the pick-up truck above and slightly in front of the rear axle. It is important that the mounting not be located too far forward of the axle to avoid unnecessary bending moments about the axle. Moreover, it is important not to mount the hitch rearwardly of the axle otherwise the tractor vehicle will tend to rear off its front wheels resulting in loss of steering control. Where a long-bed truck is employed as the tractor vehicle, relatively few difficulties are encountered in the proper mounting of a bed hitch for a fifth-wheel trailer. Recently, though, the popularity of the short-bed pick-up truck has grown. Here, there is a decreased distance between the rear axle of the pick-up truck and the cab. In such cases, as discussed more thoroughly below, the proper mounting of the bed hitch results in inadequate clearance between the forward portion of the fifth-wheel trailer and the truck cab. In order to achieve adequate clearance, the tow hitch may be moved rearwardly in the bed, behind the rear axle. However, as noted above, this creates an undesirable and potentially dangerous towing configuration.

In my U.S. Pat. No. 5,890,728 issued Apr. 6, 1999, I disclose an extension coupling for use with trailers. This extension coupling mounts to the standard hitch box on the trailer and includes a forwardly projecting elongated arm that has a proximal end pivotally connected to the mount and a distal end that has a connecting pin. The connecting pin engages the standard tow bed hitch. A retainer assembly is secured to the arm and engages the tow hitch when the trailer is interconnected to the tractor vehicle so as to resist rotation of the arm relative to the tow hitch.

Despite the extension coupling taught in my earlier patent, there remains a need for improved extension couplings and trailer-to-tractor hitches that properly distribute the trailer load on the tractor bed, that resist undesirable pivoting at the fifth wheel hitch location, that accommodate a small degree of "roll", and that allow pivoting at the location of the trailer hitch box. The present invention addresses these needs by providing and improved fifth wheel tow bed hitch and an extension coupling that is constructed to engage this hitch.

SUMMARY OF THE INVENTION

It is an object of the present invention to provide a new and useful hitch coupling adapted to interconnect a tractor vehicle and a trailer.

Another object of the present invention is to provide a new and useful fifth wheel tow bed hitch and an extension coupling for interconnecting a trailer thereto.

A further object of the present invention is to provide a hitch coupling for a trailer that moves the pivot axis of the trailer rearwardly of the tractor vehicle while maintaining the load point of the trailer on the vehicle forwardly of the tractor vehicle's rear axles.

Yet another object of the present invention is to provide a tow bed hitch and an extension coupling which allows the towing of a fifth-wheel travel trailer by a short bed pick-up truck in a safe manner.

Still a further object of the present invention is to provide an extension coupling that allows a short bed pick-up truck to be used to tow a fifth-wheel trailer with diminished risk of damage to either during the towing operation.

A further object of the present invention is to provide a tow bed hitch and an extension coupling that accommodate a small degree of "roll" between the tractor vehicle and the trailer vehicle.

According to the present invention, then, an apparatus is adapted to interconnect a trailer to a tractor vehicle. Broadly, the apparatus includes a trailer mounting assembly adapted to releasably interconnect to a trailer. The trailer mounting assembly includes a hitch box mount adapted to be secured to a hitch box of the trailer. The trailer mounting assembly also includes an extension coupling which has a proximal end portion secured pivotally to the hitch box mount about a pivot axial. The extension coupling terminates in a distal end portion, and the distal end portion is provided with a pair of oppositely projecting trunnions that extend along a load axis that is perpendicular to the pivot axis. The apparatus also includes a tow hitch assembly adapted to be secured to the bed of a tractor vehicle. The tow hitch assembly includes a pair of spaced apart receivers sized and oriented to engage the trunnions of the extension coupling to define an engaged state.

The hitch box mount that connects to the hitch box of a trailer is constructed as a pair of spaced apart side plates sized and adapted to connect to the hitch box. An upper wall member and a lower wall member interconnect to the side plates, and an optional intermediate wall can interconnect the side plates at a location equidistantly between the upper and lower wall members. A bearing is supported by the upper end wall members and is oriented along the pivot axis. Where an intermediate wall member is used, the bearing member is also supported by the intermediate wall member.

The extension coupling according to the present invention includes a spindle member disposed on the proximal end portion, with the spindle projecting along the pivot axis. This spindle is sized and adapted to mate with the bearing of the hitch box mount. To accomplish this, a releasable fastener is disposed on the spindle and is operative to secure the spindle in the bearing. The extension coupling is preferably constructed as a housing that has a top wall, a bottom wall and a distal end wall formed of a first single sheet of material bent into a U-shaped configuration. The top wall has a pair of top side edges and a pair of bottom side edges that converge in a direction from the distal end portion towards the proximal end portion. The extension coupling also has a pair of side walls and a proximal end wall formed of a second single sheet of material bent into a U-shaped configuration. Here, the side walls diverge from one another in a direction from the proximal end portion towards the distal end portion. The side walls are connected to the top and bottom walls along the top and bottom side edges thereof. Also, in the extension coupling, the trunnions are preferably defined by opposite end portions of a single cylindrical bar that extends across the distal end portion of the extension coupling.

The tow hitch assembly includes at least a base and a rocker assembly releasably secured to the base. Preferably, a load member is releasably secured to the base and the rocker assembly is releasably secured to the load member. The base is constructed as a housing having a truncated pyramid shape with an apex portion having an open chamber formed therein. The load member then includes a rocker support member and a pair of leg members dependingly downwardly therefrom in spaced relation to one another. The open chamber is sized to matably release the legs. Connectors are included that secure the legs such that the rocker support member is positioned above the base.

It is desired that the rocker member be positionable at a plurality of positions above the base. To this end, the leg members can include a plurality of openings that can register with openings in the chamber so that connecting bolts may be secured through the legs and the wall of the chamber to selectively position the load member at different relative heights.

The rocker member is pivotally secured relative to the base. Where the load member is employed, the rocker assembly is pivotally secured to the load member so that the rocker member may rotate or "roll" along the axis of the direction of travel. This rotation is limited to a small degree of rotation, and cushion elements are provided on the load member and are positioned so to provide resilient limits stops operative to cushion relative pivotal movement of the rocker assembly and to prevent pivotal movement past the selected angular positions.

In any event, the rocker assembly has a pair of bay regions that define the receivers for the trunnions. These bay regions may be formed as channels in channel pieces aligned such that the channels and the trunnions are substantially coaxial when the trunnions are in the engaged state. To help mount and demount the trailer from the tractor vehicle, an inclined ramp structure is located proximately to each of the base rearwardly of the tractor vehicle. A pair of outwardly flared wing structures are disposed on the outer sides of the rocker assembly. Thus, the wing structures and the ramp act to guide the trunnions into the rocker assembly bay regions. A releasable locking bar is associated with each of the bay regions and is operative in a locking state to retain the trunnions in the engaged state yet releasable into an unlocking state whereby the trunnions can be disengaged from the rocker assembly. These locking bars are biased into the locking state. A locking plate element is also included and is manually moving between a first position wherein the locking bars are latched in the locking state and a second position wherein the locking bars are withdrawn into a retracted state.

These and other objects of the present invention will become more readily appreciated and understood from a consideration of the following detailed description of the exemplary embodiment of the present invention when taken together with the accompanying drawings, in which:

DETAILED DESCRIPTION OF THE EXEMPLARY EMBODIMENT

The present invention is directed to the interconnection of a tractor vehicle to a trailer so that the trailer may be towed across a transport surface. The invention particularly concerns an extension coupling which interconnects to an improved fifth wheel tow bed hitch on the tractor vehicle thus to maintain the same loading point on the tractor vehicle while at the same time allowing the trailer vehicle to be displaced a small distance rearwardly of the tractor vehicle. The present invention is specifically useful for fifth-wheel trailers to be pulled by pick-up trucks. Accordingly, the present invention is described with respect to such a truck/trailer combination; however, it should be understood that the present invention may be used in other applications, as well.

Figure 1:
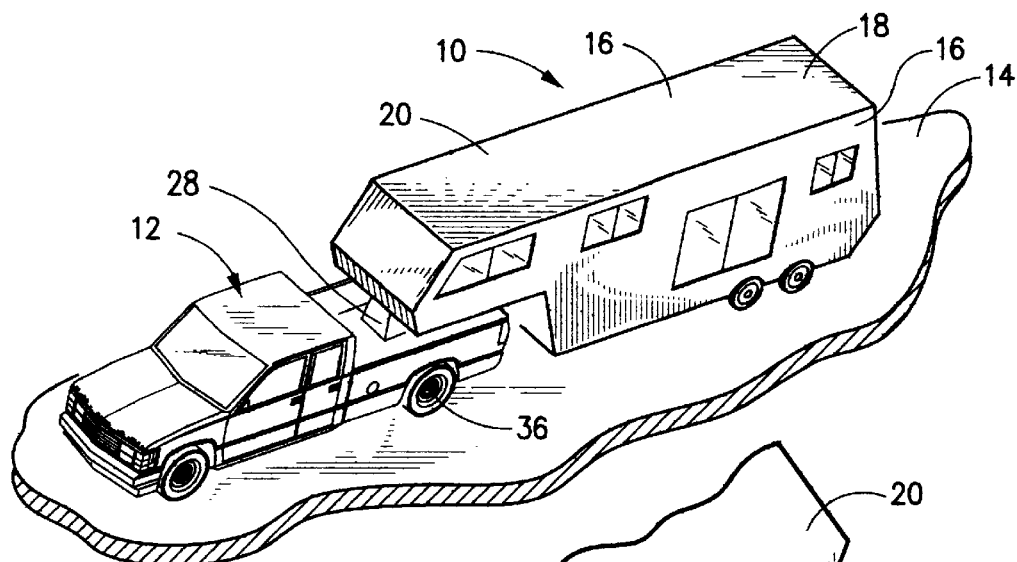
FIG. 1 is a perspective view of a fifth-wheel travel trailer being towed by a tractor vehicle having a short box bed according to the prior art.
Figure 2:
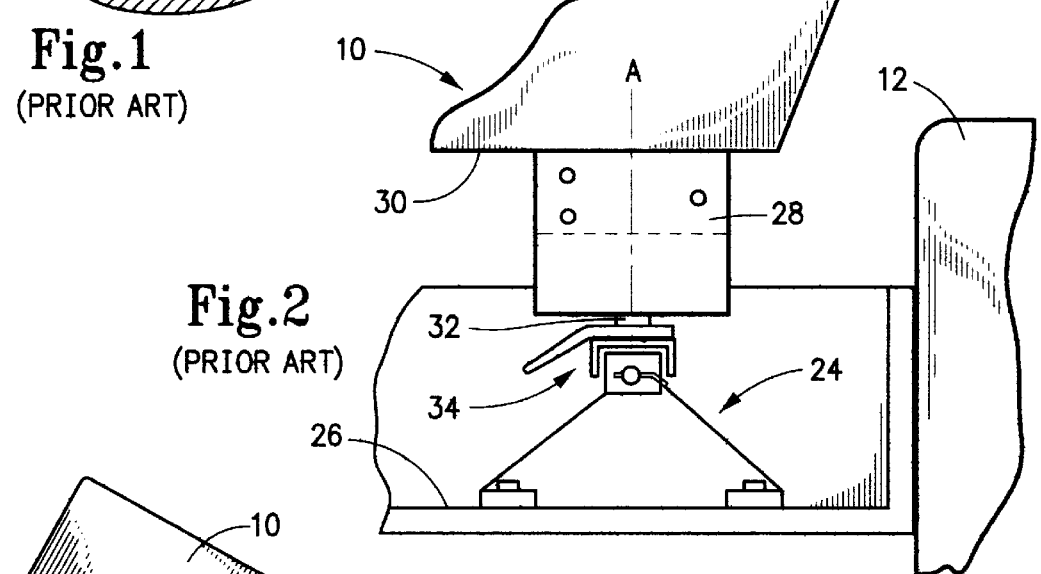
FIG. 2 is a side view in partial cross-section showing the mounting of the fifth-wheel trailer of FIG. 1 to the bed of the tractor vehicle according to the prior art.

A trailer hitch coupling for a fifth-wheel trailer according to the prior art is generally shown in FIGS. 1 and 2. In FIG. 1, it may be seen that a fifth-wheel trailer 10 is adapted to be towed by a tractor vehicle in the form of a short bed pick-up truck 12 so that it may be moved along a transport surface such as a roadway 14. Trailer 10 has a housing 16 having a rear portion 18 and a front portion 20. Rear portion 18 of housing 16 is supported on surface on roadway 14 by means of a wheel set 22. Front portion 20 of housing 16 is connected to truck 12 and is supported thereby.

With reference now to FIG. 2, it may be seen that the traditional interconnection of trailer vehicle 10 to truck 12 is accomplished by a fifth-wheel bed hitch 24 which is mounted in the bed 26 of truck 12. A connector box 28 is secured to mounting plates on front portion 20 of trailer 10 so that connector box 28 downwardly depends from an underside 30 of front portion 20. A connector pin 32 depends downwardly from connector box 28 and is engaged by a cooperative double-acting releasable locking mechanism 34 provided on bed hitch 24. With this mounting, trailer 10 may rotate about a vertical axis "A" that is oriented slightly forwardly of the rear axle for rear wheels, such as rear wheels 36 (FIG. 1).

It is important that bed hitch 24 be mounted as close to the rear axle of truck 12 as possible so as to allow the weight of trailer 10 to be supported directly above the axle. It is desirable, though, that the bed hitch 24 be mounted slightly forwardly of the rear axle, though, in order to diminish the likelihood that truck 12 will "rear" onto its back tires with the front tires having diminished contact with the roadway or other support surface. The tendency of the vehicle to rear under heavy loads is substantially increased if bed hitch 24 is either mounted directly above or rearwardly of the rear axle of truck 12.

Figure 4:
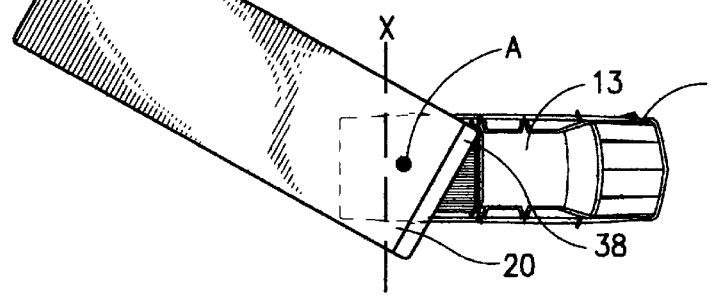
FIG. 4 is a top plan view of the truck and trailer combination of FIGS. 1 and 3 showing its reduced turning radius.
Figure 3:
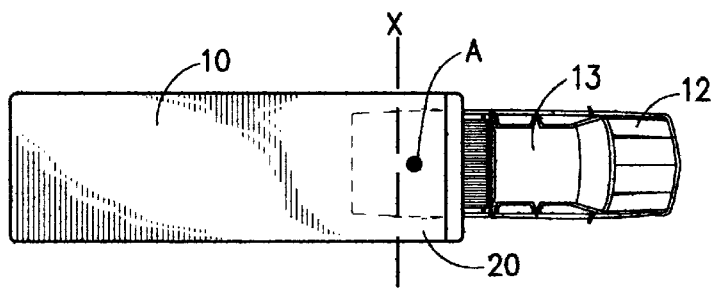
FIG. 3 is a top plan view of the prior art truck and trailer combination of FIG. 1 with the trailer being towed in a straight line.

With reference now to FIGS. 3 and 4, a disadvantage of the prior art may now be appreciated where truck 12 is a short bed pick-up truck. Here, it may be seen that, in order to keep the bed hitch forwardly of the rear axle, so that axis "A" is forward of the rear axle, as is represented by transverse axis "X" results in diminished spacing between cab 13 of truck 12 and forward portion 20 of trailer 10. While towing trailer 10 in a straight line, as is shown in FIG. 3, this causes no problems. However, the turning radius of the combination of truck 12 and trailer 10 is diminished, as is shown in FIG. 4. As is shown in this figure, when the vehicle is making a turn, the corner 38 of forward portion 20 can contact cab 13 which can result in damage to truck 12, trailer 10 or both. The present invention is directed to resolving this problem.

Figure 5:
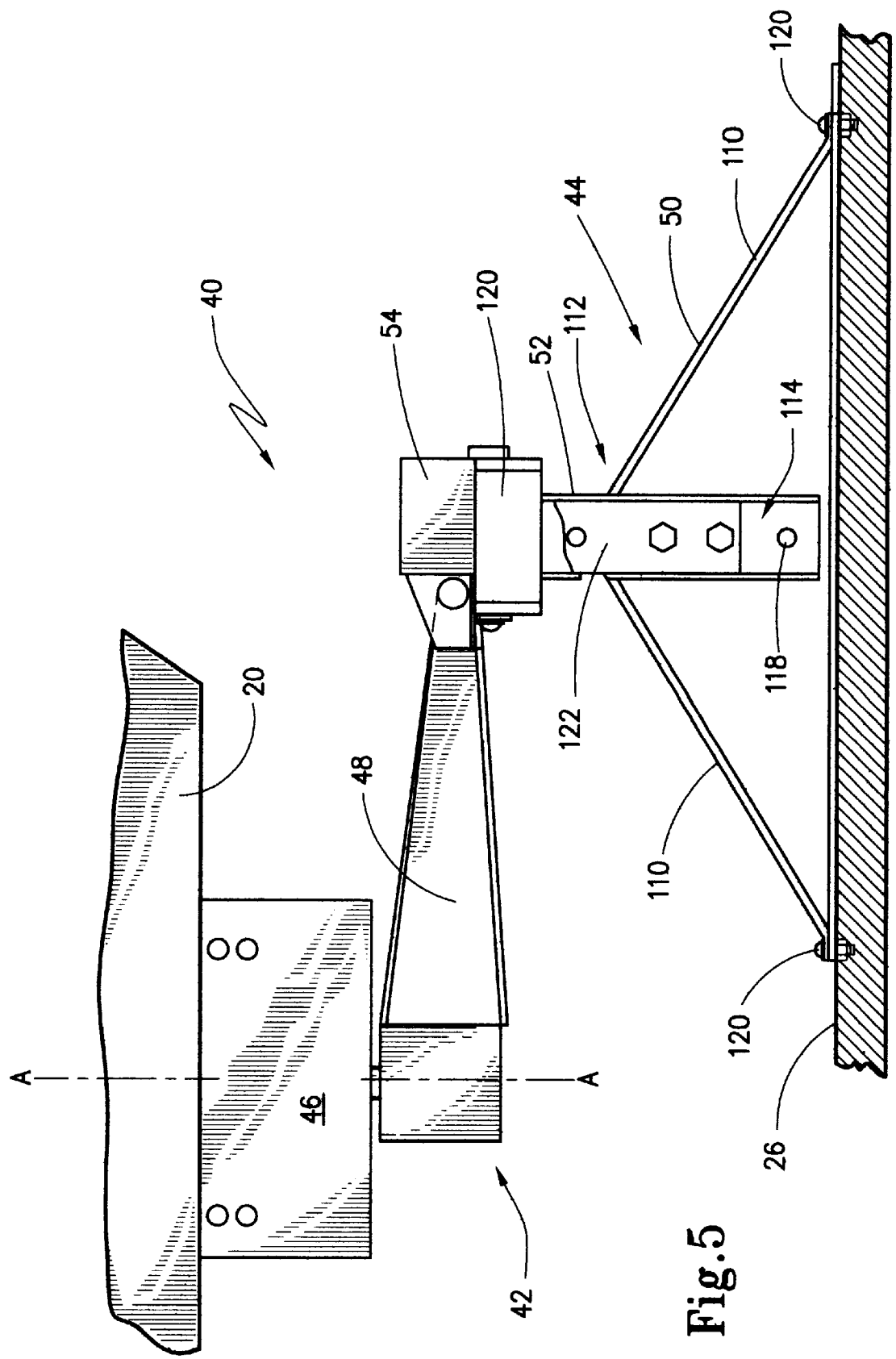
FIG. 5 is a side view in elevation and partially in cross-section showing the hitch apparatus according to the exemplary embodiment of the present invention.

With reference now to FIG. 5, it may be seen that tractor/trailer interconnecting apparatus coupling 40 according to the exemplary embodiment of the present invention is constructed to interconnect with a tractor vehicle, such as a short bed truck, and a trailer so as to maintain the load point of the trailer forwardly of the rear axle of the truck while at the same time displacing the trailer a selected distance rearwardly of the truck. Moreover, the present invention maintains the pivot axis for trailer at the existing hitch box, all as described more thoroughly below.

With reference to the figures, it may be seen in FIG. 5 that the tractor/trailer interconnecting apparatus 40 includes a trailer mounting assembly 42 and a tow hitch assembly 44 that engage one another. Trailer mounting assembly 42 is secured to the hitch box of front portion 20 (of trailer 10). Tow hitch assembly 44 is mounted to bed 26 (of truck 12). Trailer mounting assembly 42 broadly includes a hitch box mount 46 and an extension coupling 48 that are described in greater detail below. Tow hitch assembly 44, according to the exemplary embodiment of the present invention, broadly includes a base 50, a load member 52 and a rocker assembly 54, all as described more thoroughly below. It should be understood that extension coupling 48 may be received and retained in rocker assembly 54 to define an engaged state, but extension coupling 48 may be released from rocker assembly 54 to allow the tractor and trailer vehicles to be separated.

The structure of trailer mounting assembly 42 is best seen in reference to FIGS. 6–9. In these figures, it may be seen that hitch box mount 46 includes a pair of spaced apart side plates 61 and 62 which are planar and parallel to one another. A flat, horizontal upper wall member 64 and a flat, plate-like lower wall member 66 extend between side plates 61 and 62 and extend for the length thereof. An intermediate wall member 68 preferably extends between side plates 61 and 62 for the length thereof. Upper wall member 64, lower wall member 66 and intermediate wall member 68 are constructed identically and are oriented parallel with one another. Intermediate wall member 68 is equidistantly spaced between upper wall member 64 and lower wall member 66. Wall members 64, 66 and 68 each have a centrally located opening formed therethrough so as to receive and support a bearing 70 along a pivot axis "A". Bearing 70 may be welded in position or otherwise permanently affixed to wall members 64, 66 and 68. It should now be understood, also, that side plates 61 and 62 have holes 72 that may be bolted or otherwise affixed to the mounting plates 56 that form the hitch box for trailer 10.

Figure 6:
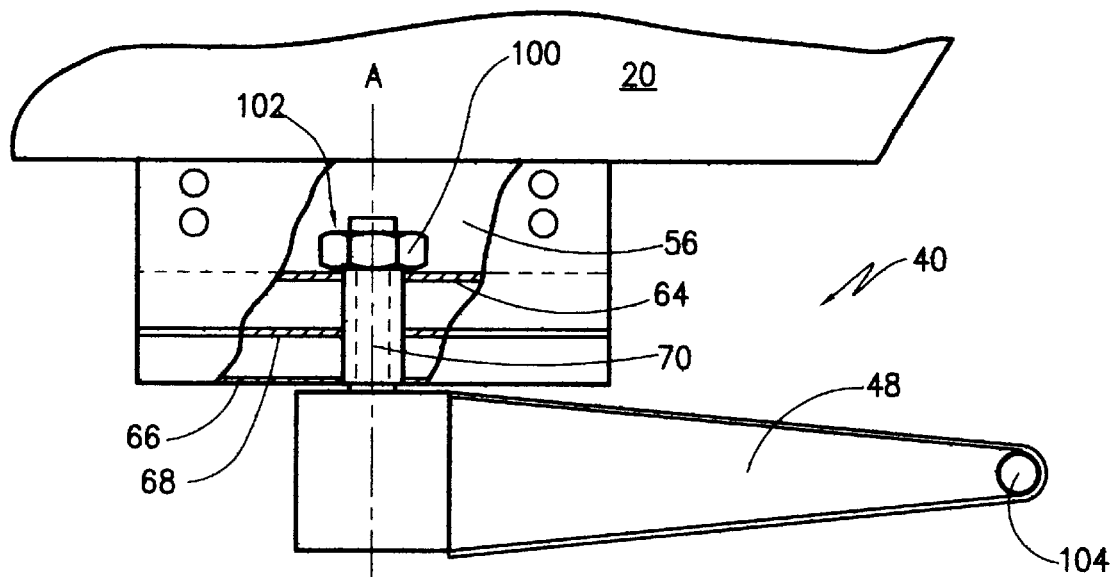
FIG. 6 is a side view in elevation, partially broken away, showing the trailer mounting assembly including an extension coupling and hitch box mount according to the exemplary embodiment of the present invention.
Figure 7:
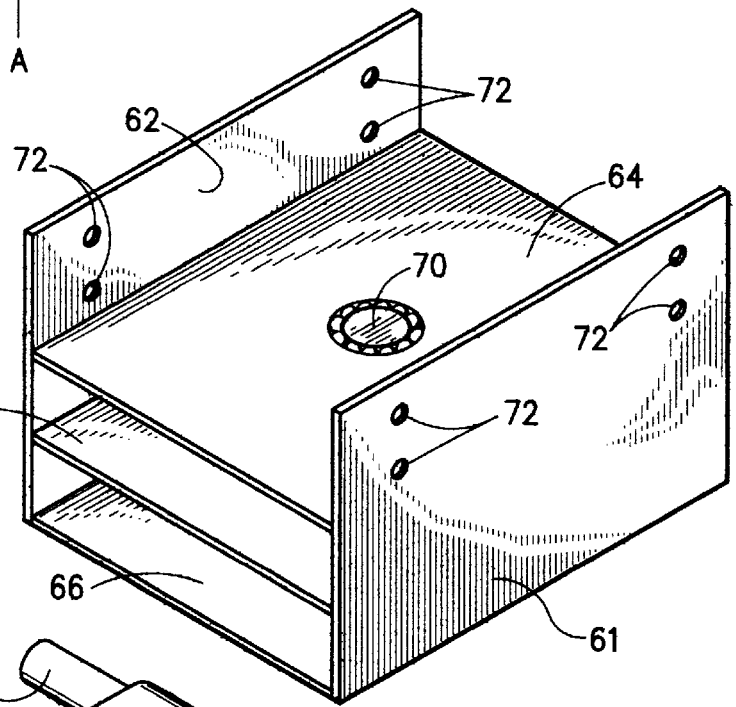
FIG. 7 is a perspective view showing the hitch box mount of FIG. 5.
Figure 8:
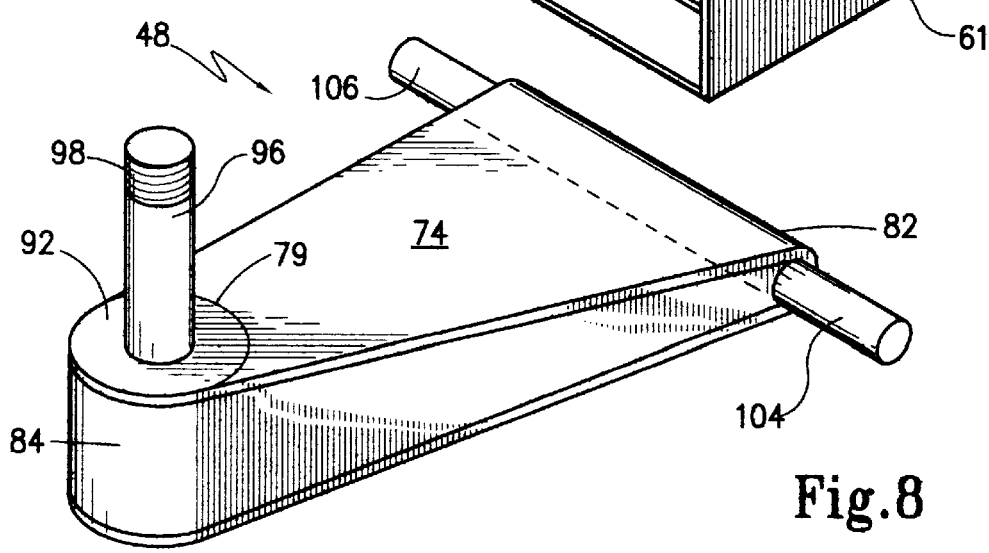
FIG. 8 is a perspective view showing the extension coupling of FIG. 5.
Figure 9:
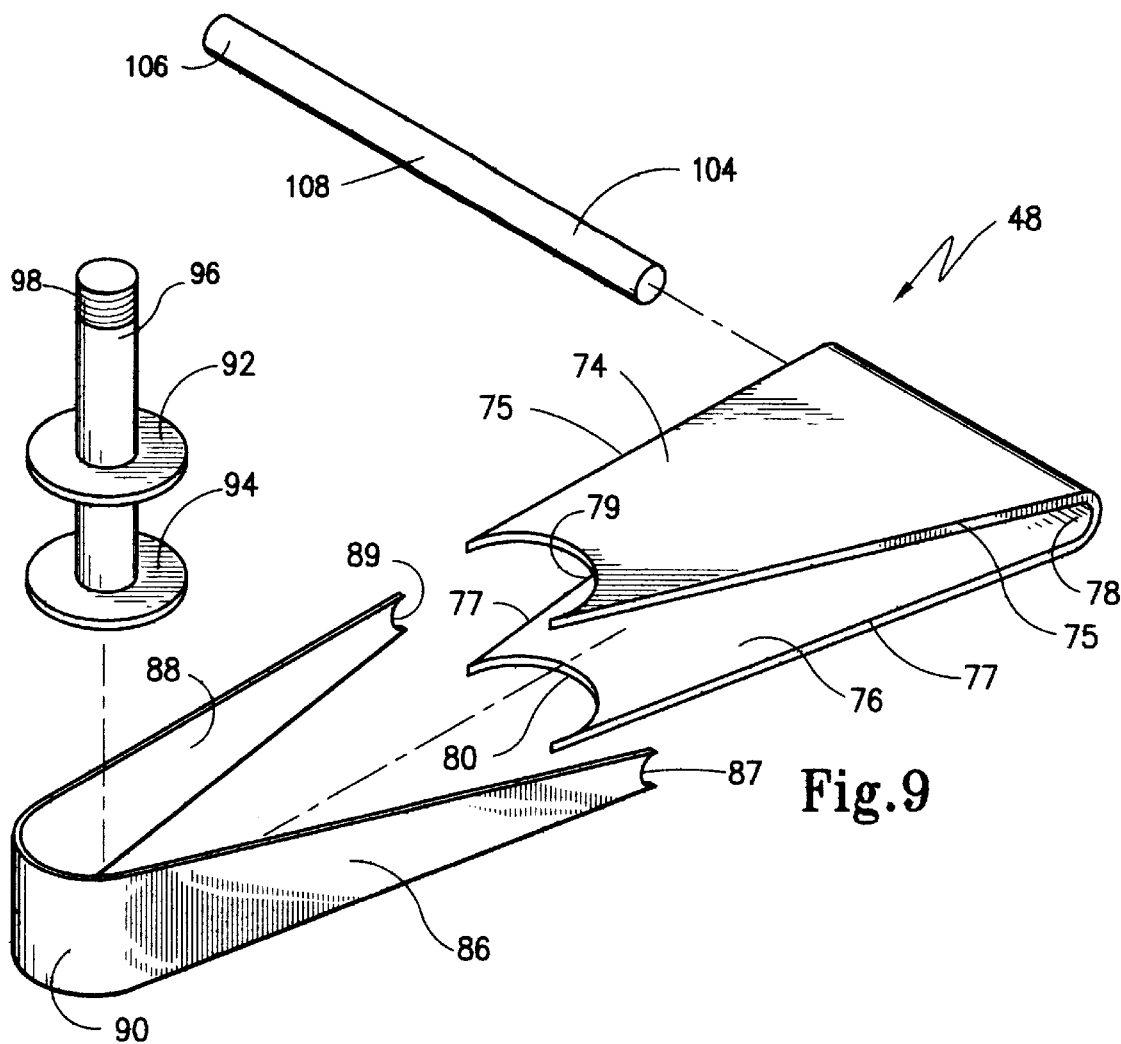
FIG. 9 is and exploded view in perspective showing the extension coupling and hitch box mount of FIG. 5.

The structure of extension coupling 48 is best shown in FIGS. 6, 8 and 9. Here, it may be seen that extension coupling 48 has a top wall 74, a bottom wall 76 and a distal end wall 78 that are formed out of a single sheet of material, such as steel, bent into a U-shaped configuration. Top wall 74 has a pair of top side edges 75 that converge toward one another in a direction from distal end portion 82 toward proximal end portion 84. Similarly, bottom wall 76 has a pair of bottom side edges 77 that converge toward one another in a direction from distal end 82 to proximal end portion 84 of extension coupling 48. Extension coupling 48 also includes a pair of side walls 86 and 88 and a proximal end wall 90 that are formed out of a single sheet of material, again such as steel, bent into a U-shaped configuration. Side walls 86, 88 diverge from one another in a direction from proximal end portion 84 toward distal end portion 82. Side walls 86 and 88 are connected to top and bottom walls 74, 76 along the top edges 75 and bottom edges 77 thereof.

Top and bottom walls 74, 76 respectfully have arcuate cut-outs 79 and 80, respectively, that are formed at a radius of curvature that matches the curvature of proximal end wall 90. With reference to FIGS. 8 and 9, it may be seen that a pair of circular support plates 92 and 94 are affixed to the top and bottom edges of proximal end wall 90 and to top and bottom walls 74, 76 along edges 79 and 80, respectively. A spindle 96 is affixed to plates 92 and 94 and projects upwardly to terminate in a threaded end portion 98. Spindle 96 is in the form of a cylindrical bar axle that fits into bearing 70 and may be retained therein by a nut 100 received on threaded end 98. A cotter pin 102 prevents nut 100 from becoming inadvertently removed from threaded end 98. With this structure, it should be understood that extension coupling 48 may pivot about pivot axis "A" as shown in FIGS. 5 and 6.

With reference to FIGS. 6, 8 and 9, it may be seen that distal end portion 82 of extension coupling 48 is provided with a pair of oppositely projecting trunnions 104 and 106 which, as may be seen in FIG. 9, are the opposite end portions of a single cylindrical bar 108, again preferably of a steel material. Bar 108 has a radius of curvature that matches the radius of curvature of distal end wall 78, and it should be appreciated that each of side walls 86 and 88 terminate in radial edges 87 and 89, respectively, that match the radius of curvature of bar 108. Thus, bar 108 is snugly fitted between distal end wall 78 and edges 87 and 89 are may be permanently affixed and positioned by welding or other techniques known in the art.

Figure 10:
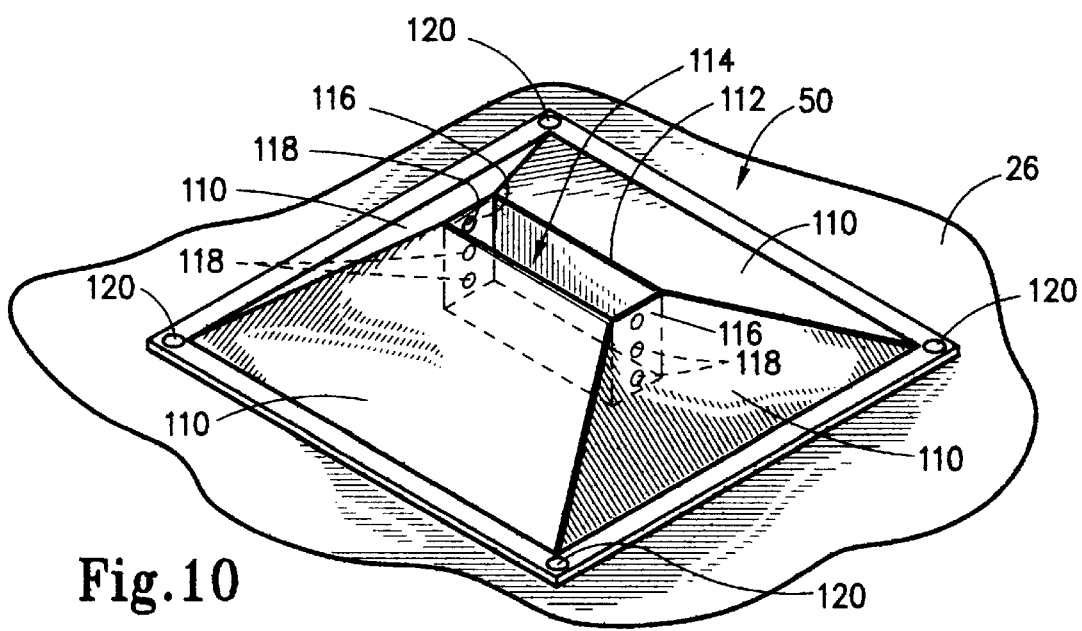
FIG. 10 is a perspective view of the fifth wheel bed base according to the exemplary embodiment of the present invention.

The structure of tow hitch assembly 44 is best shown in reference to FIGS. 5 and 10–15. With reference to FIGS. 5 and 10, it may be seen that base 50 is constructed as a housing having a truncated pyramid shape with four side walls 110 and an apex portion 112. Apex portion 112 has an open chamber 114 formed therein with chamber 114 having a rectangular shape. End walls 116 of chamber 114 have a plurality of openings 118 that are used for the adjustment of the height of rocker assembly 54, as described below. Base 110 may be affixed to bed 26 of a tractor vehicle by means of bolts 120 or otherwise as is known in the art.

Figures 11, 12:
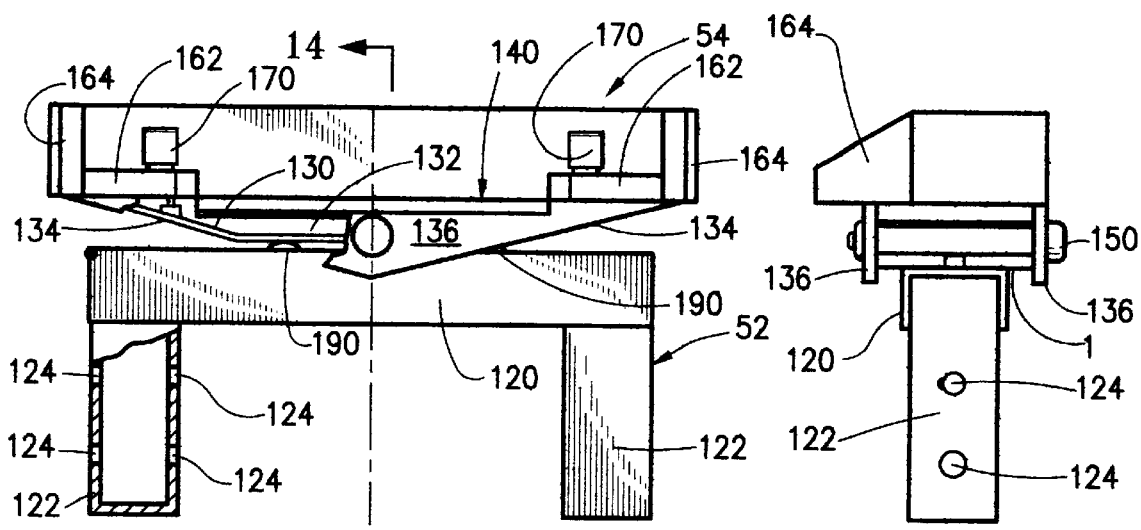
FIG. 11 is a front view in elevation of the fifth wheel connecting assembly according to the exemplary embodiment of the present invention.
FIG. 12 is a side view in elevation of the fifth wheel connecting assembly of FIG. 10.

A load member 52 is shown in FIGS. 5, 11 and 12 and includes a rocker support member 120 and a pair of legs 122 that are spaced apart from one another and downwardly depend from rocker support member 120. Legs 122 are provided with pairs of holes 124 that may register with holes 118, and suitable bolts may be fastened so that the relative height of rocker support member 120 may be adjusted relative to bed 26 of the tractor vehicle. Legs 122 are generally tubular and approximately square shaped so that they may engage chamber 114 in close-fitted relation, as shown in FIG. 5. Each of legs 122 and rocker support member 120 may be formed by steel Ushaped channel pieces that are welded together.

Load member 52 supports rocker assembly 54 so that it may rotate or "roll" a small angular degree about axis "X" which corresponds to the direction of travel. The structure of rocker assembly 54 is best shown in FIGS. 5 and 11–15. Here, it may be seen that rocker assembly 54 includes a rocker plate 130 that has central section 132 and a pair of end sections 134 that upwardly and outwardly diverge from central section 132. Rocker plate 130 extends between and is secured by a pair of triangular truss plates 136. Triangular truss plates 136 may be formed out of a common piece of material so as to have an upper support wall 138 that includes a front angled section 140, a rear horizontal section 142 and a central vertical section 144 interconnecting sections 140 and 142. A cylindrical sleeve 146 extends between truss plates 136 at a central location thereof and aligns with openings 137 so that a retaining pin 150 may pass through to releasably secure rocker assembly 54 to load member 52. To this end, a cotter pin 152 retains pin 150 in sleeve 146.

In order to engage trunnions 104 and 106, rocker assembly 54 is provided with a pair of spaced apart receivers which form a bay to receive the distal end portion of extension coupling 48. As is shown best in FIGS. 11–14, each of these receivers is in the form of a U-shaped channel piece 160 and a ramp portion 162 associated with each channel piece 160. Ramp portions 162 provide an inclined surface so that, as the tractor and trailers vehicles are advanced toward one another, trunnions 104, 106 may contact and ride up onto ramps 162 so that they may drop into channels 161. Channel pieces 160 are aligned with one another such that trunnions 104, 106 and channels 161 are substantially coaxial when the trunnions are in the engaged state. To further facilitate and guide the distal end portion of extension coupler 48 into rocker assembly 54, the outer ends of rocker assembly 54 are provided with flared wing structures 164. Support plates 166 (FIG. 14) are used to help reinforce ramp structures 162 and extend between ramp structures 162 and brace plates 165.

Figure 13:
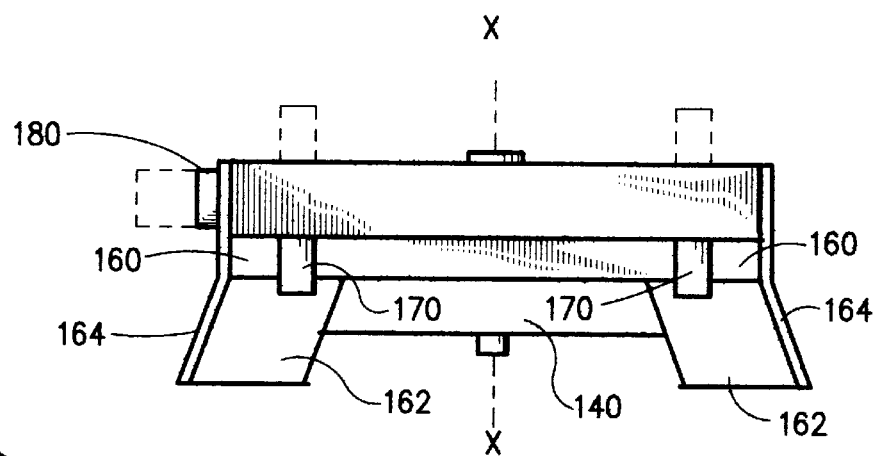
FIG. 13 is a top plan view of the fifth wheel connecting assembly of FIG. 10.
Figure 14:
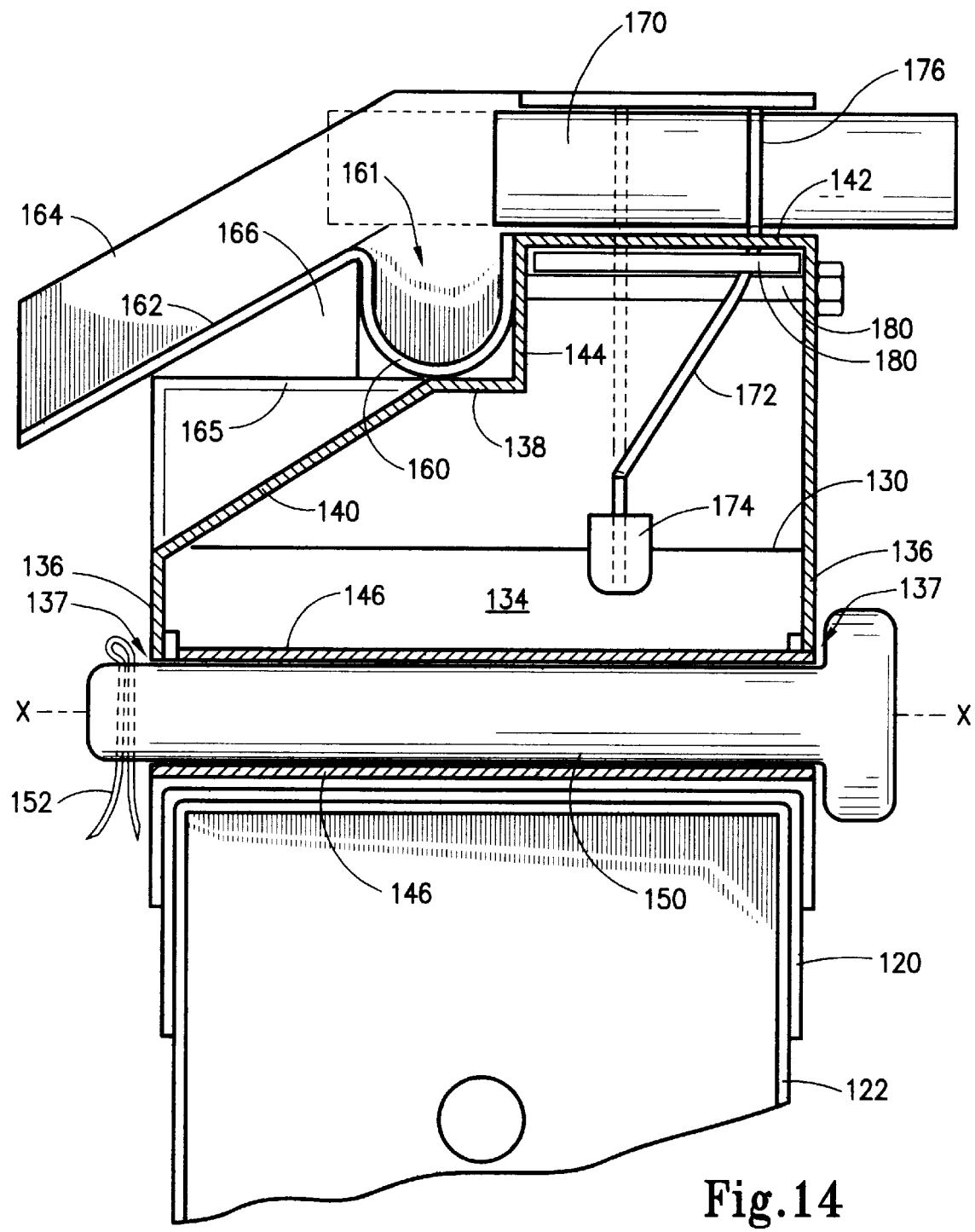
FIG. 14 is a cross-sectional view taken about lines 14—14 of FIG. 11.

As may be seen in FIGS. 11, 13 and 14, the rocker assembly 54 includes a pair of locking bars 170 which are movable between a locking state shown in FIG. 13 and a retracted state shown in FIG. 14. Locking bars 170 are biased into the locking state by means of a leaf springs such as leaf spring 172 that is connected by a bracket 174 to a respective end section 134 of rocker plate 130. It should be understood that there is a leaf spring 172 associated with each locking bar 170. The end of each leaf spring 172 opposite bracket 174 may be received in an appropriate channel 176 formed through its respective locking bar 170.

Figure 15:
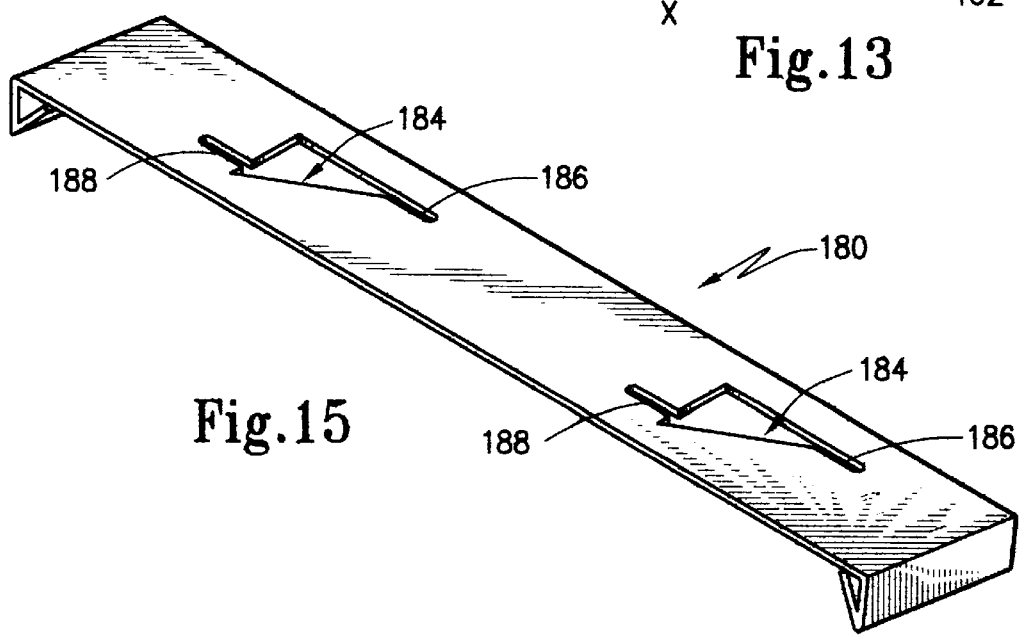
FIG. 15 is a perspective view of the locking plate used with the of the fifth wheel connecting assembly of FIG. 10.

A locking plate 180 is shown in FIGS. 14 and 15 and is supported by support pins 182 so that it is slidably disposed between pins 180 and wall portion 142. Locking plate 180 has a pair of cut-out regions 184 that have linear extensions 186 and 188 formed at corners thereof. When locking bar 180 is in the position shown in FIG. 13, springs 172 are received in linear extensions 188 so as to retain locking bars 170 in the retracted position. This allows decoupling of the trailer and tractor vehicles. When the tractor and trailer vehicles are to be coupled, locking plate 180 is moved so that springs 172 are disengaged from slots 188 and locking bars 170 move to the locking position by the biasing of springs 172. As trunnions 104, 106 move upwardly on ramps 162, they will press against locking bars 170 to move them toward the retract state until trunnions 104, 106 drop into channels 161. At this point, locking bars 170 are biased into the locking state. Locking plate 180 may then be moved to the position shown in phantom in FIG. 13. In this position, springs 172 are engaged by slots 186 so that locking bars 170 are retained in the locked position.

To permit a small amount of roll about axis "X", it should be appreciated that rocker assembly 54 may angularly rotate a small degree about axis "X". In order to prevent over rotation, and to cushion this rotation, a pair of cushion elements 190 are provided on rocker support member 120 and bear against central section 132 of rocker plate 130.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

I claim:

1. Apparatus adapted to interconnect a trailer to a tractor vehicle, comprising:

(a) a trailer mounting assembly adapted to releasably interconnect to a trailer, said trailer mounting assembly including
      (i) a hitch box mount adapted to be secured to a hitch box of the trailer; and
      (ii) an extension coupling having a proximal end portion secured to the hitch box mount and pivotable about a pivot axis, said extension coupling terminating in a distal end portion, said distal end portion provided with oppositely projecting trunnions aligned about a load axis that is perpendicular to the pivot axis; and (b) a tow hitch assembly adapted to be secured to a bed of a tractor vehicle, said tow hitch assembly including a pair of spaced-apart receivers sized and oriented to engage the trunnions of said extension coupling to define an engaged state.

2. Apparatus according to claim 1 wherein said hitch box mount includes a pair of spaced-apart side plates sized and adapted to connect to the hitch box of the trailer, an upper wall member and a lower wall member interconnecting said side plates, and a bearing supported by said upper and lower wall members and oriented along the pivot axis.

3. Apparatus according to claim 2 wherein said hitch box mount includes and intermediate wall member located between said upper and lower wall members, said bearing being supported by said intermediate wall member.

4. Apparatus according to claim 2 wherein said extension coupling includes a spindle disposed on the proximal end portion thereof and projecting along the pivot axis, said spindle sized and adapted to mate with said bearing, and including a releasable fastener disposed on said spindle and operative to secure said spindle in said bearing.

5. Apparatus according to claim 1 wherein said extension coupling has a top wall, a bottom wall and a distal end wall formed of a first single sheet of material bent into a U-shaped configuration, said top wall having a pair of top side edges and a pair of bottom side edges that converge from the distal end portion toward the proximal end portion and wherein said extension coupling has a pair of side walls and a proximal end wall formed of a second single sheet of material bent into a U-shaped configuration, said side walls diverging from one another in a direction from the proximal end portion toward the distal end portion and connected to top and bottom walls along the top and bottom side edges thereof.

6. Apparatus according to claim 1 wherein said trunnions are defined by opposite end portions of a cylindrical bar that extends across the distal end portion of said extension coupling.

7. Apparatus according to claim 1 wherein said tow hitch assembly includes a base and a rocker assembly releasably secured to said base.

8. Apparatus according to claim 7 wherein said base is constructed as a housing having a truncated pyramid shape with an apex portion having an open chamber formed therein.

9. Apparatus according to claim 7 wherein said rocker member is positionable at a plurality of positions above said base.

10. Apparatus according to claim 7 wherein said rocker assembly is pivotally secured relative to said base.

11. Apparatus according to claim 7 wherein said rocker assembly has a pair of bay regions defining the receivers and operative to respectively engage said trunnions.

12. Apparatus according to claim 11 wherein the bay regions are formed as channels aligned such that the channels and said trunnions are substantially coaxial when said trunnions are in the engaged state.

13. Apparatus according to claim 12 including an inclined ramp structure located proximately to each of the bays.

14. Apparatus according to claim 12 including a pair of outwardly flared wing structures disposed on outer sides of said rocker assembly.

15. Apparatus according to claim 7 wherein said rocker assembly is releasably mounted to a load member and said load member is releasably mounted to said base.

16. Apparatus according to claim 15 wherein said rocker assembly is pivotally secured relative to said load member and wherein said load member includes a rocker support member and a plurality of cushion elements disposed on said load member and positioned to provide resilient limit stops operative to cushion relative pivotal movement of said rocker assembly and to prevent pivotal movement past selected angular positions.

17. Apparatus according to claim 15 wherein said base is constructed as a housing having a truncated pyramid shape with an apex portion having an open chamber formed therein, said load member including a rocker support member and a pair of leg members depending downwardly therefrom in spaced relation to one another, said open chamber sized to matably receive said legs, and including connectors that secure said legs such that said rocker support member is positioned above said base.

18. Apparatus according to claim 7 wherein said rocker assembly includes a releasable locking bar operative in a locking state to retain said trunnions in the engaged state yet releasable into an unlocking state whereby said trunnions can be disengaged from said rocker assembly.

19. Apparatus according to claim 18 wherein said locking bar is biased into the locking state.

20. Apparatus according to claim 19 including a locking plate operable in a first position to retain said locking bar in the locking state and in a second position to retain said locking bar in a retracted state.

21. Apparatus adapted to interconnect a trailer to a tractor vehicle, comprising:

(a) a trailer mounting assembly adapted to releasably interconnect to a trailer, said trailer mounting assembly including
      (i) a hitch box mount adapted to be secured to a hitch box of the trailer; and
      (ii) an extension coupling having a proximal end portion secured to the hitch box mount and pivotable about a pivot axis, said extension coupling terminating in a distal end portion, said distal end portion provided with oppositely projecting trunnions aligned about a load axis that is perpendicular to the pivot axis; and (b) a tow hitch assembly adapted to be secured to a bed of a tractor vehicle, said tow hitch assembly including a base, a load member releasably mounted to said base and a rocker assembly releasably mounted to said load member, said rocker assembly having a pair of spaced-apart receivers sized and oriented to engage the trunnions of said extension coupling to define an engaged state.

22. Apparatus according to claim 21 wherein said rocker assembly is pivotally secured to said load member.

23. Apparatus according to claim 22 wherein said load member is positionable at a plurality of positions above said base.

24. Apparatus according to claim 21 wherein said rocker assembly has a pair of bay regions defining the receivers and operative to respectively engage said trunnions.

25. Apparatus according to claim 24 wherein said rocker assembly includes a pair of releasable locking bars operative in a locking state to retain said trunnions in the engaged state yet releasable into an unlocking state whereby said locking bars are retracted such that said trunnions can be disengaged from said rocker assembly, there being one of said locking bars associated with each of the bays.

26. Apparatus according to claim 25 wherein each said locking bar is biased into the locking state.

27. Apparatus according to claim 21 wherein said trunnions are defined by opposite end portions of a cylindrical bar that extends across the distal end portion of said extension coupling.

* * * * *